United States Patent [19]

Wolfe

[11] Patent Number: 5,390,121
[45] Date of Patent: Feb. 14, 1995

[54] BANDED ON-OFF CONTROL METHOD FOR SEMI-ACTIVE DAMPERS

[75] Inventor: Paul T. Wolfe, Erie, Pa.

[73] Assignee: Lord Corporation, Erie, Pa.

[21] Appl. No.: 109,287

[22] Filed: Aug. 19, 1993

[51] Int. Cl.$^6$ .................. B60G 17/015; F16F 9/18
[52] U.S. Cl. ..................... 364/424.05; 364/426.03; 280/707; 188/280
[58] Field of Search ............... 364/424.05, 426.03; 280/707, 840, 772; 188/280, 290

[56] References Cited

U.S. PATENT DOCUMENTS

| | | | |
|---|---|---|---|
| 3,807,678 | 4/1974 | Karnopp et al. | 248/358 R |
| 4,682,010 | 3/1987 | Sugasawa | 280/707 |
| 4,686,626 | 8/1987 | Kuroki et al. | 364/426 |
| 4,729,459 | 3/1988 | Inagaki et al. | 188/299 |
| 4,821,849 | 4/1989 | Miller | 188/280 |
| 4,829,436 | 5/1989 | Kowalik et al. | 364/424.05 |
| 4,838,392 | 6/1989 | Miller et al. | 188/277 |
| 4,887,699 | 12/1989 | Ivers et al. | 280/707 |
| 4,970,645 | 11/1990 | Adachi et al. | 364/424.05 |
| 4,976,454 | 12/1990 | Bohn | 280/707 |
| 5,046,008 | 9/1991 | Dieter | 364/424.05 |
| 5,054,813 | 10/1991 | Kakizaki | 280/772 |
| 5,062,657 | 11/1991 | Majeed | 280/707 |
| 5,071,157 | 12/1991 | Majeed | 280/707 |
| 5,087,068 | 2/1992 | Kukanaga et al. | 280/707 |
| 5,088,760 | 2/1992 | Kakizaki et al. | 280/707 |
| 5,096,219 | 3/1992 | Hanson et al. | 280/707 |
| 5,189,615 | 2/1993 | Rubel et al. | 364/424.05 |
| 5,207,774 | 5/1993 | Wolfe et al. | 137/625.32 |
| 5,248,015 | 9/1993 | Yoshioka et al. | 188/299 |
| 5,255,191 | 10/1993 | Fulks | 364/424.05 |
| 5,276,621 | 1/1994 | Henry et al. | 364/424.05 |
| 5,276,622 | 1/1994 | Miller et al. | 364/424.05 |
| 5,276,623 | 1/1994 | Wolfe | 364/424.05 |

OTHER PUBLICATIONS

*Vibration Control Using Semi-Active Force Generators,* Karnopp et al., Journal of Engineering for Industry, May 1974.

"Multi-State Damping Force Adjustable Shock Absorber", Kayaba Industry Co., Ltd.

"Shock Absorbers with Remote Control", Koni.

912672, "Semi-Active Heave and Roll Control for Large Off-Road Vehicles", Margolis et al.

LL-7004, "Vibration Control Using Semi-Active Force Generators", Crosby et al., Lord Corporation.

*Primary Examiner*—Kevin J. Teska
*Assistant Examiner*—Tan Q. Nguyen
*Attorney, Agent, or Firm*—Randall S. Wayland; Richard K. Thomson

[57] ABSTRACT

A control method for semi-active damper (32) which oscillates in real time (at the frequency of the moving member (22) motion or higher) between a high-damping On state and a low-damping Off state wherein the On and Off damping states are selected by the driver via a driver selectable switch (60) and overridden when the absolute velocity differential across the suspended body exceeds a threshold value and the signs are opposite. Damping bands can be set to a luxury, touring, or sport mode via the driver selectable switch (60). This system provides driver selectable ride feel and yet controls excessive roll and pitch due to vehicle maneuvers, braking, and acceleration by overriding the driver selectable setting whenever the absolute velocity differential threshold setting is exceeded and the directional signs are different. When the threshold is exceeded and the signs are opposed, the null band is adjusted to a narrower setting to initiate control of the damper. This allows the null band to be set wider for normal driving, providing better isolation.

12 Claims, 6 Drawing Sheets

BANDED ON-OFF CONTROL METHOD FOR SEMI-ACTIVE DAMPERS

FIELD OF THE INVENTION

This invention relates to methods for controlling dampers. Specifically, the invention relates to the area of control methods that includes sensing the motion of moving members and adjusting the damping parameters of a controllable semi-active damper attached between said members.

BACKGROUND OF THE INVENTION

Controllable semi-active dampers for providing a controllable damper force in real time are described in the commonly assigned U.S. Pat. No. 3,807,678 to Karnopp et al. entitled "System for Controlling the Transmission of Energy Between Spaced Members" which is hereby incorporated by reference herein. The Karnopp et al. '678 patent describes a passive spring 24 arranged in parallel to an active viscous damper 26. The damping characteristics of the damper are actively varied in a real-time fashion as a function of feedback signals such as position, velocity, and acceleration. The system described in Karnopp '678 does not require any user input.

Both Koni and Kayaba Industry Co. Ltd. offer a shock absorber in which the damping force is user adjustable. However, these user adjustable shock absorbers are only passively adjustable in that the valve does not react to changing road conditions in a real time fashion. The valve remains at the position setting that is set by the user. Thus, under certain abrupt changes in road conditions, or abrupt vehicle maneuvers, large undesirable body motions can be experienced, such as during cornering, accelerating or braking.

Other adjustable shock absorbers do react to vehicle roll by sensing such things as lateral acceleration as described in U.S. Pat. No. 5,054,813 to Kakazaki and U.S. Pat. No. 5,087,068 to Fukanaga et al. Inagaki et al., U.S. Patent No. 4,729,459, teaches sensing the force in each shock absorber via piezoelectric elements to determine the occurrence of roll. Dieter U.S. Pat. No. 5,046,008 describes using side-slip angle, yaw velocity, roll angle, and lateral acceleration to determine a condition indicative of roll. In each case, as roll is sensed and compared to a threshold, the shock absorber then adjusts to a hard damping state to deter vehicle roll when said threshold is exceeded. The threshold has to be set tightly to make sure that no appreciable amount of roll occurs before the damper is commanded to a hard state. This has the disadvantage of creating a harsh ride under most non-roll conditions because the null band has to be set so tightly. This harshness is a result of the damper tracking minor road perturbations. Thus, the prior systems experience a tradeoff between providing a smooth ride and controlling roll, neither of which can the prior art systems control optimally.

SUMMARY OF THE INVENTION

The present invention solves the prior devices compromise between roll or pitch control and ride control by providing a control method which includes measuring the absolute velocity differential across the body of a vehicle. These measurements are used to determine when the vehicle is under a conditions of roll (as caused by cornering or swerving), or pitch (as caused by braking or acceleration), to set the threshold null band to a tighter setting when roll or pitch is sensed. This tightening of the null band occurs only when roll or pitch conditions are sensed thus providing a wider threshold setting for normal driving conditions, resulting in better isolation.

Further, the present invention provides a control method which selectively provides controlled damping to a semi-active controllable damper including damping states which oscillate in real time between a high-damping On state and a low-damping Off state. The magnitude of said On and Off states are controlled by a driver-controlled ride setting switch to provide different ride-feel characteristics dependent on said drivers preference, said preferences being overridden by said control when a condition of roll or pitch is sensed by adjusting the null band to a tighter setting.

Furthermore, the present invention includes a semi-active damper which is controllable in real time (less than about 15 milli-seconds (ms) switching response time) which includes user selectable driving characteristics. These settings are selectable between hard ride as provided in a performance/sport mode, a medium ride as provided by a touring setting, and soft ride as provided by a luxury setting. These driver selectable settings are overridden when a condition of roll or pitch is sensed to tighten the null band of the primary control algorithm.

The present invention provides a method of controlling a semi-active suspension system, comprising the steps of setting the On state and Off state damping level of at least two semi-active dampers dependent upon a driver selected setting, determining the absolute velocity differential and directional sign of at least two spaced apart portions of a first moving member, setting a threshold width of a null band of a primary control algorithm responsive to said absolute velocity differential and said directional sign of said at least two spaced apart portions, and overriding said damping level dependent on said driver selected setting when said absolute velocity differential exceeds said threshold width of said null band and when said directional signs are opposite, thus commanding said null band to a narrower width and as a result, initiating control of said semi-active dampers.

The present invention also provides a controllable suspension system, comprising in combination, a semi-active damper including a shock body for attaching to one of a first moving member and a second moving member, a piston rod telescopically received within said shock body, said piston rod attaches to the other of said first and said second moving member; a semi-active valve associated with said semi-active damper for semi-actively varying the damping state of said semi-active damper between an On state and an Off state in real time; a spring in parallel spring relation to said semi-active damper; driver selectable means for selecting a magnitude of damping of said On state and said Off state of said semi-active valve; at least two sensors for producing two electrical signals from which an absolute velocity differential and a directional sign between two portions of said first moving member can be extracted; and means for overriding said driver selectable means when a threshold value of said absolute velocity differential derived from said at least two sensors is exceeded and said directional sign of said electrical signal is opposite.

Finally, the present invention provides a controllable suspension system, comprising at least two semi-active dampers attached between a first moving member and a second moving member and controlled by a primary control algorithm, each said semi-active damper including a semi-active valve for semi-actively varying the damping state of said semi-active dampers between a high-damping On state and a low-damping Off state in real time, at least two acceleration sensors from which an electrical signal indicative of the absolute velocity differential and directional signs between two portions of said first moving member can be derived, and a null band setting associated with said control algorithm which is responsive a threshold value of said absolute velocity differential derived from said sensors such that when said absolute velocity differential is below said threshold value said null band setting is set wider and said low-damping Off state is commanded and when said absolute velocity differential is exceeded and said directional signs are opposed, said null band setting is set narrower and a control of said dampers is commanded.

It is an advantage of the present semi-active damper that includes damping that varies in real time between a high damping state (On) and a low damping state (Off), that the magnitudes of the On and Off states can be selected by the driver, yet are overridden to provide improved vehicle safety when roll or pitch is sensed by tightening a null band.

It is still a further advantage the null band can be set wider and thus provide a higher level of isolation when the null band spacing is controlled based upon the absolute velocity differential and directional sign of the input velocities.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate an embodiment of the present invention. The drawings and description together, serve to fully explain the invention. In the drawings.

Detailed Description of the Invention

Figure 1:
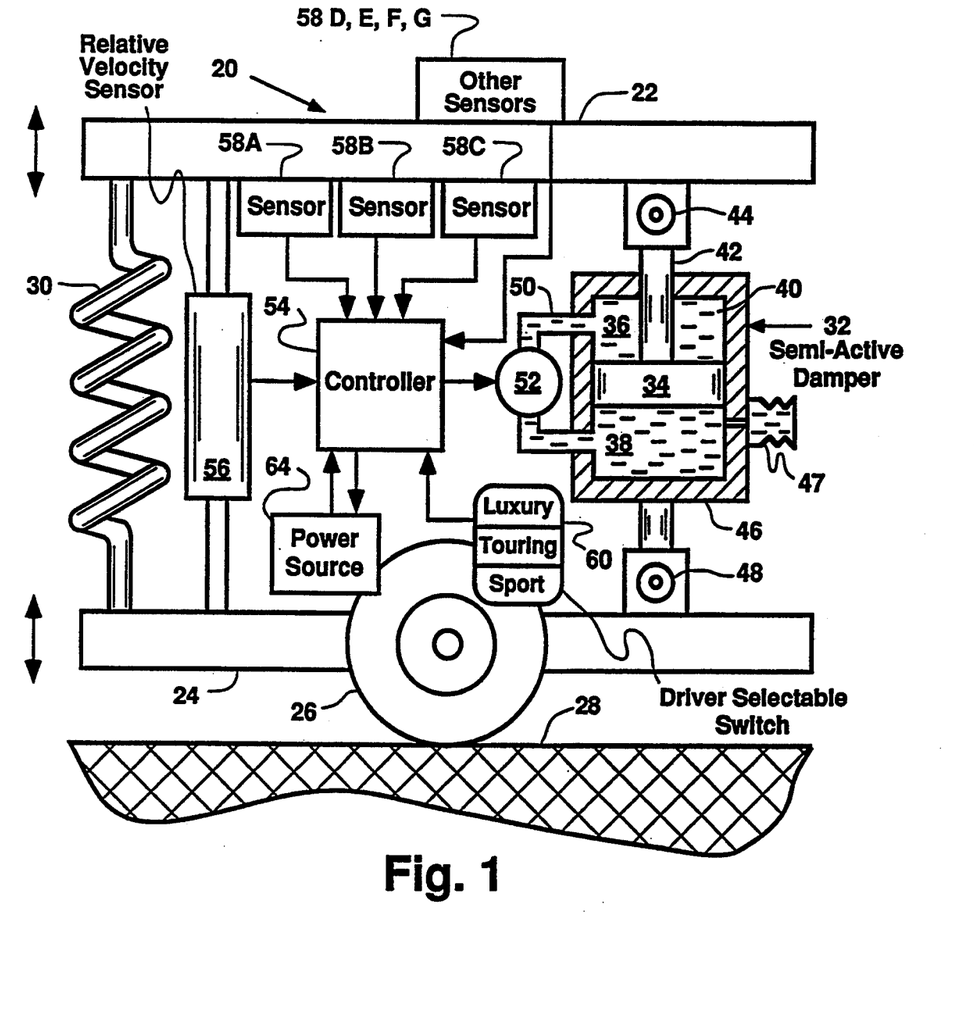
FIG. 1 is a schematic diagram illustrating the controllable semi-active damper of the present invention including driver selectable damping characteristics.

The controllable semi-active suspension system 20 of the present invention is shown schematically in FIG. 1. Suspension system 20 includes a first movable member 22 such as a vehicle frame, body, or cab and a second moving member 24 spaced apart therefrom such as a vehicle axle, A-arm, frame or other component. A spring 30 flexibly interconnects first and second moving members 22 and 24 and carries the static loads, i.e., the weight of first moving member 22. Generally, a wheel and tire assembly 26 is connected to the movable member 24, however, this assembly can be placed between any two moving bodies, such as a truck cab and frame or between moving machine components that experience pitch or roll motion. In the embodiment shown, the tire and wheel assembly 26 is in contact with a road surface 28. Varying road inputs will tend to compress and extend spring 30 and at least two semi-active dampers 32 (one shown) which are placed in parallel spring relation therewith. What is illustrated in FIG. 1 is one corner of a primary suspension for a vehicle.

Each semi-active damper 32 includes a piston 34 which is attached to piston rod 42, both of which are telescopically received within the damper body 46. The piston 34 separates the internal cavity into a first fluid chamber 36 and second fluid chamber 38. The piston rod 42 connects to the first moving member 22 via a connection 44, such as a rod end or circular or split elastomer bushing as is known to those skilled in the art. Likewise the damper body 46 connects to second moving member 24 via a second connection 48 which also may be a rod end, circular or split elastomer bushing. Compression and extension of semi-active damper 32 will cause fluid 40 which is contained within, and substantially fills, first and second chambers 36 and 38 to flow through passage 50 and through a controllable semi-active valve 52.

The controllable semi-active valve 52 is variable such that the damping characteristics of the semi-active damper 32 can be changed in real time, i.e. react instantaneously to a sensed input in less than about 15 milliseconds. Generally, semi-active systems react to vehicle body or moving member 22 motions at least at the frequency of motion of the moving member 22. This is considerably faster than adaptive systems which adapt to changing conditions in a slow fashion. The controllable semi-active valve 52 can be of the type taught in the commonly assigned U.S. Pat. Nos. 5,207,774 or 4,838,392 which are hereby incorporated by reference herein. The valve 52 may also be of the magnetorheological type as taught in copending applications, Ser. Nos. 07/900,571 and 07/900,567, now U.S. Pat. Nos. 5,277,281 and 5,284,330, issued to Carlson et al. the disclosures of which are hereby incorporated by reference herein. Alternatively, the valve could be electrorheological.

The semi-active damper 32 further includes a compensator 47 to compensate for the volume of fluid 40 displaced during the extension and compression strokes of the semi-active damper 32. This compensator 47 is needed to accommodate the fluid 40 displaced by the portion of piston rod 42 extending into chamber 36. The controllable semi-active valve 52 is controlled by an electronic controller 54. Controller 54 receives an inputs from a relative velocity sensor 56 which senses the relative velocity as between the first and second moving members 22 and 24. This input is fed into controller 54 and is used as a parameter to accomplish the control of the semi-active damper 32. The control can be skyhook control, or the like, as is known to those skilled in the art. Input from at least two of sensors 58A, 58B and 58C are also fed into the electronic controller 54. The other sensors 58D, 58E, 58F, and 58G may include steering angle sensors, braking sensors, accelerator sensors, gear sensors, roll angle sensors and speed sensors. The controller 54 also takes input from the driver selectable switch 60. This allows the driver to select between three ride setting preferences, such as luxury (low damping), touring (intermediate damping), or sport (high damping).

The controller 54, based upon the position of the driver selectable switch 60 then sends a signal to the controllable valve 52 to change the damping level settings for both the On state and the Off state of the semi-active damper cycle. The damper 32 then will provide Off state damping magnitude values which are the lowest for luxury setting, intermediate for touring settings and highest for performance or sport settings. Likewise the damping On state will be the lowest for luxury setting, intermediate for touring settings and highest for performance or sport settings. The On state damping level is always higher than the Off state damping level for any driver preference mode. This provides driver selectable ride characteristics for each setting depending on the type of driving contemplated. For example, in a sport setting, the driver will experience a more stable and responsive performance ride.

Contrarily, when the setting is set to luxury, optimum isolation is achieved at the expense of more body roll and pitch. The touring setting provides a mix of luxury feel and performance characteristics. However, in order to improve the safety of the driver when the setting is in the luxury or touring mode, the controller will override the null band settings under certain conditions.

Figure 2:
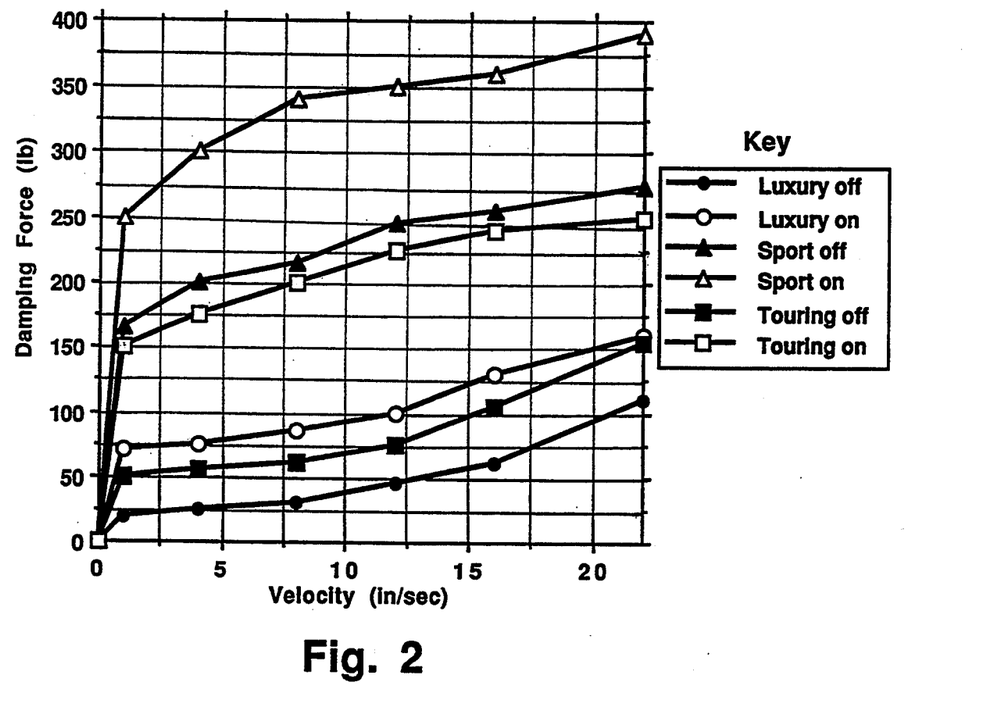
FIG. 2 is a damping vs. velocity performance curve of the semi-active damper illustrating the On-state and Off-state damping levels for sport, touring, and luxury modes.

FIG. 2 illustrates the performance of a semi-active damper 32 incorporating banded On/Off control. The figure illustrates the damper force in pounds (lb) versus the velocity across the damper in inches per second (in/sec) for the luxury, sport, and touring mode settings. The banded concept provides various levels of semi-active control, from a luxury ride to a performance ride, by allowing the driver to selectively set the damping On and Off pairs. In other words, for each driver selectable setting there is a pair of damping settings corresponding therewith. For example, the On or high damping setting and the Off or low damping setting are preset and stored in memory in the electronic controller 54 (FIG. 1) such that when the driver sets the damping setting at the sport setting, for instance, the damping level will oscillate between high and low damping levels that are predetermined and stored in memory when the null band is exceeded.

By way of example and not by limitation, the damper setting might be 350 pounds (lb) in the On state and only 250 pounds (lb) in the Off state when the switch is set to sport mode and the On state might be 65 pounds (lb) in the On state and 35 pounds (lb) in the Off state when set in the luxury mode.

Figure 3:
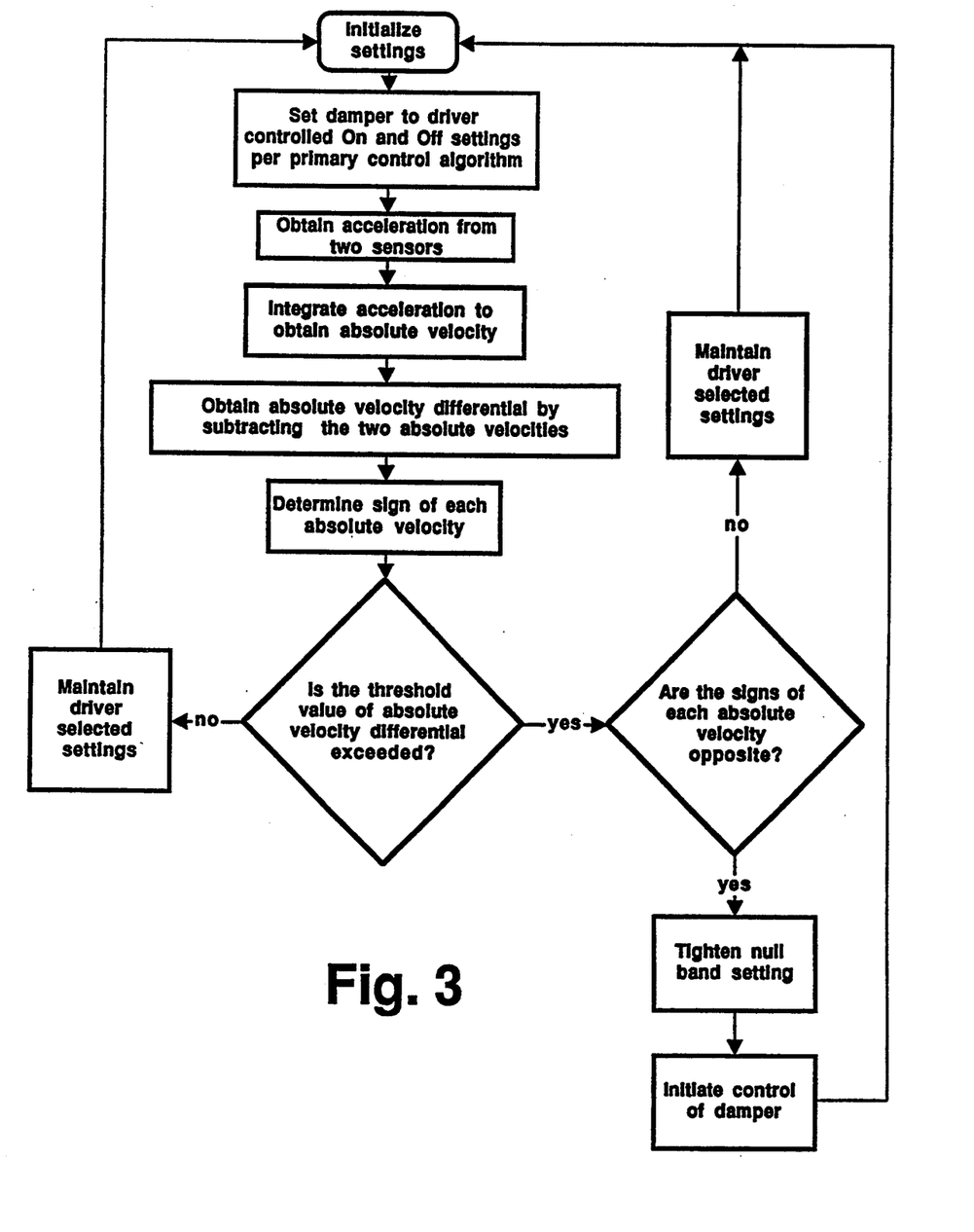
FIG. 3 is a flow diagram of the method of controlling a semi-active damper.

FIG. 3 illustrates a flow diagram where, dependent upon the position or mode setting of the driver selectable switch 60 (FIG. 1), the primary control algorithm then sets the On and Off damping settings by adjusting the valve position in a hydraulic damper or the voltage setting in an electrorheological or magnetorheological damper. Further, the primary control algorithm will override the driver selectable switch 60 (FIG. 1) setting under certain conditions, such as when the absolute velocity differential from two spaced apart acceleration sensors exceeds a set threshold value and the signs of the signals from the two sensors are opposed. The absolute velocity is obtained by integrating the acceleration signal from each sensor. The sign of the signal is extracted directly from the accelerometer signal. When the threshold is exceeded and the signs are opposite, the damper null band will be set tighter to initiate control of the damper. Generally, the control will dictate setting the damper to a higher damping setting than that dictated by the user-selectable setting.

As a departure from the art, this is accomplished by reducing the width of the null band when the absolute velocity differential threshold is exceeded and the signs of the two sensor signals are opposite. Reducing the width of the null band to initiate control of the damper has the advantage that the null band can be set wider for normal driving conditions providing the more stringent control only when necessary. This allows the damper to provide better isolation or optimum control for more of the time.

Figure 4:
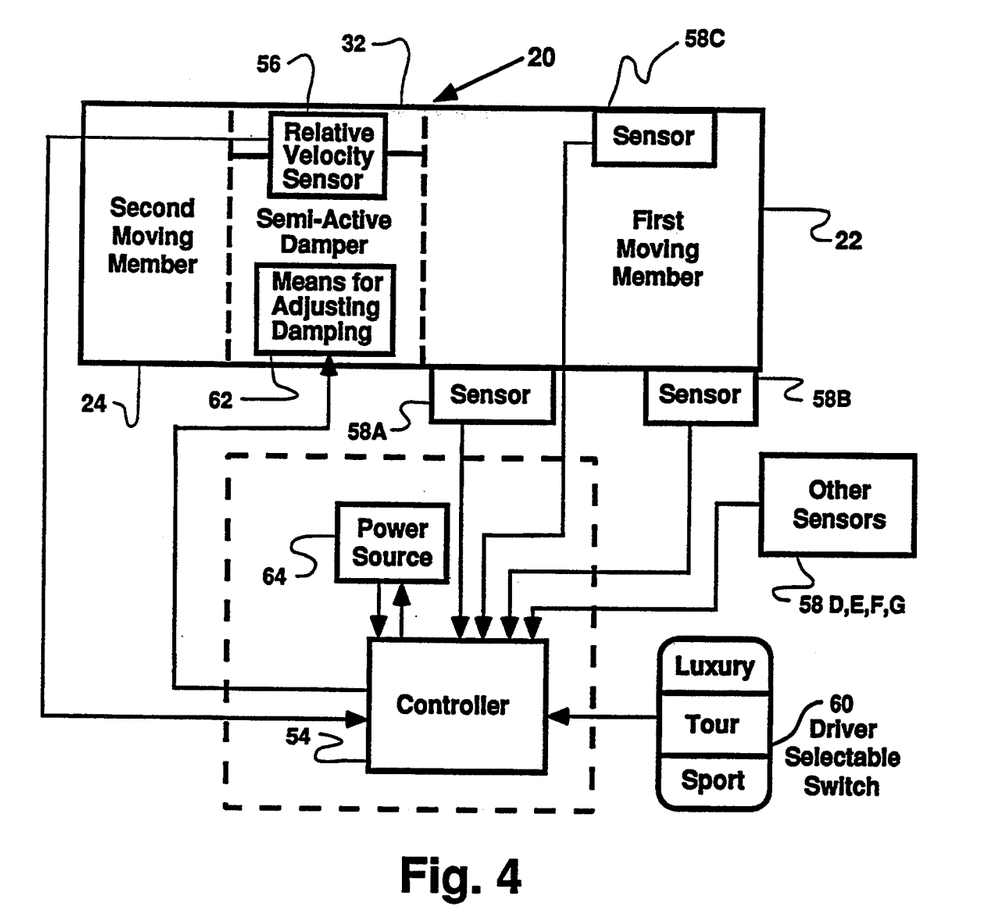
FIG. 4 is a block diagram of the elements in the system.

FIG. 4 illustrates a block diagram of the driver selectable semi-active suspension system 20 which includes at least two semi-active dampers 32 (only one shown), such as the aforementioned hydraulic, magnetorheological or electrorheological type, with associated means for adjusting damping 62. The controller 54 sets the damping On and Off settings based upon the settings of the driver selectable switch 60 and the relative velocity readings from sensors 56, and absolute velocity signals from sensors 58A, 58B, and 58C. The other sensors 58D, 58E, 58F and 58G are used as inputs to the primary control which may be skyhook control or the like. The block diagram illustrates the at least two dampers 32 attached between first and second moving member 22 and 24.

Figure 5:
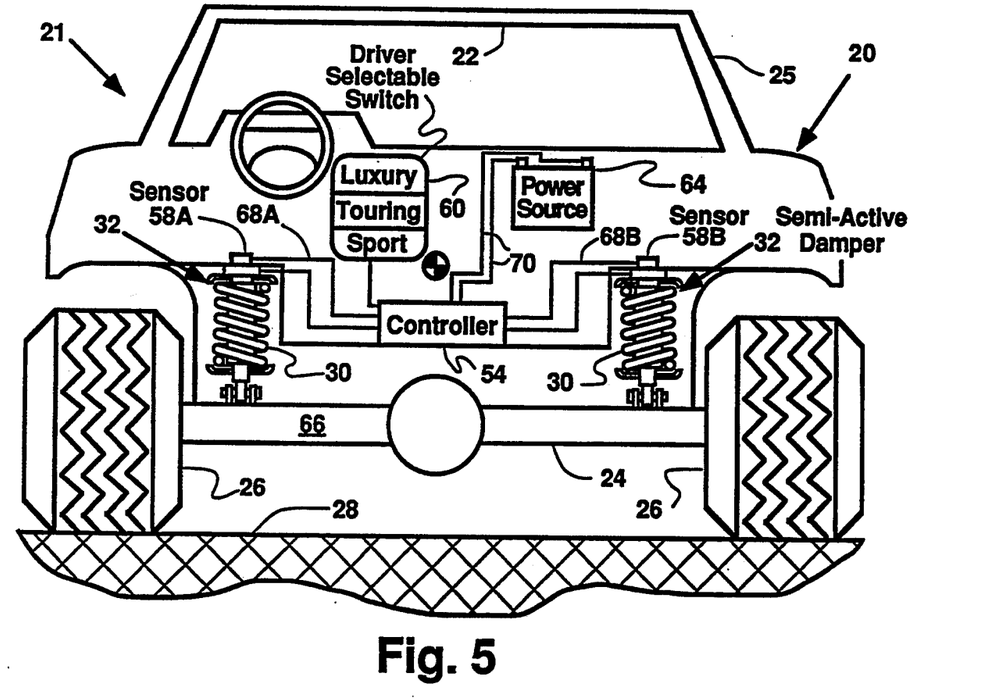
FIG. 5 is a schematic rear view illustrating the components in the system.

FIG. 5 illustrates the controllable suspension system 20 in a vehicle environment where the vehicle suspension includes an axle 66, tire and wheel assemblies 26 which contact road surface 28. Semi-active dampers 32 are spaced apart across the width of the vehicle 21 and used to control the motion of the vehicle body 25 which represents the first moving member 22. The vehicle body 25 moves relative to the axle 66 which represents the second moving member 24. Each semi-active damper 32 includes a spring 30 for supporting the static load. Sensors 58A and 58B send a signal indicative of the motion of a portion of the first moving member 22 adjacent the semi-active damper 32. Sensors 58A are preferably accelerometers.

The signal indicative of the absolute motion of first moving member 22 is fed into controller 54 via leads 68A and 68B. The damping setting of each damper 32 is preset according to the preference of the drive via driver selectable switch 60. The power to drive the electronic controller 54, controllable valve 62 (FIG. 4) of semi-active damper 32, and sensors 58A and 58B is provided by power source 64 such as a 12 volt (V) vehicle battery through leads 70. The control algorithm includes null band that includes an upper and a lower voltage setting forming a band. When the magnitude of absolute velocity voltage from sensor 58A ($V_{absA}$) minus the magnitude of absolute velocity voltage from sensor 58B ($V_{absB}$) exceeds a threshold voltage value and the velocities are in the opposite directions, i.e., they are of different sign, then the width or size of the null band is decreased such that the dampers 32 are forced into a controlled mode. Normally, when the vehicle body 25 is receiving small road inputs, the dampers 32 will be automatically set to a low-damping Off state.

The improvement of the present invention is that now the null bands can be set much wider, such that maximum isolation can be achieved for the majority of the time. When conditions are present, such as when both portions of the vehicle body 25 are moving upward or downward in unison within the null band, a low-damping Off state is commanded. Only when the excursions fall out of the null band is primary control of the damper initiated. Typically skyhook control or the like will be initiated when the excursions fall outside the null band; otherwise, the damping will be set to a minimum level.

Figure 5A:
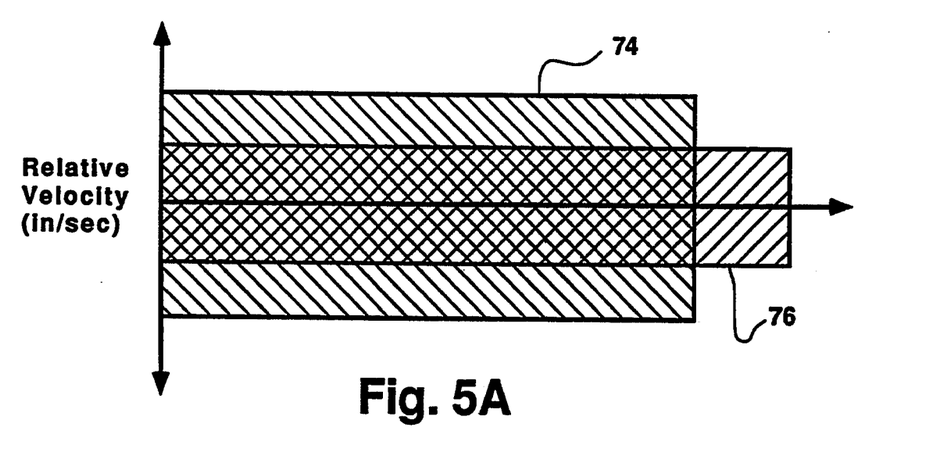
FIG. 5A is a diagram illustrating the widened null band.

FIG. 5A illustrates the null band. The wider null band 74 is encompasses conditions where there is normal vertical road inputs to the vehicle and minimal roll or pitch motion is encountered. As long as the relative velocity inputs fall within the null band, no damper control is initiated. However, when a condition is sensed via sensors 58A, 58B, 58C (FIG. 6) where the roll or pitch is extreme, such as during cornering, braking, or acceleration, the absolute velocity differential will be exceeded. When this occurs and the signs of the absolute velocities at the different points of the vehicle body 25 are in the opposite directions, then the null band is set to a narrower null band 76. This will, in turn, initiate control of the dampers. Generally, the damper will be set to a higher damping level, although it may not be the highest damping level available.

Figure 6:
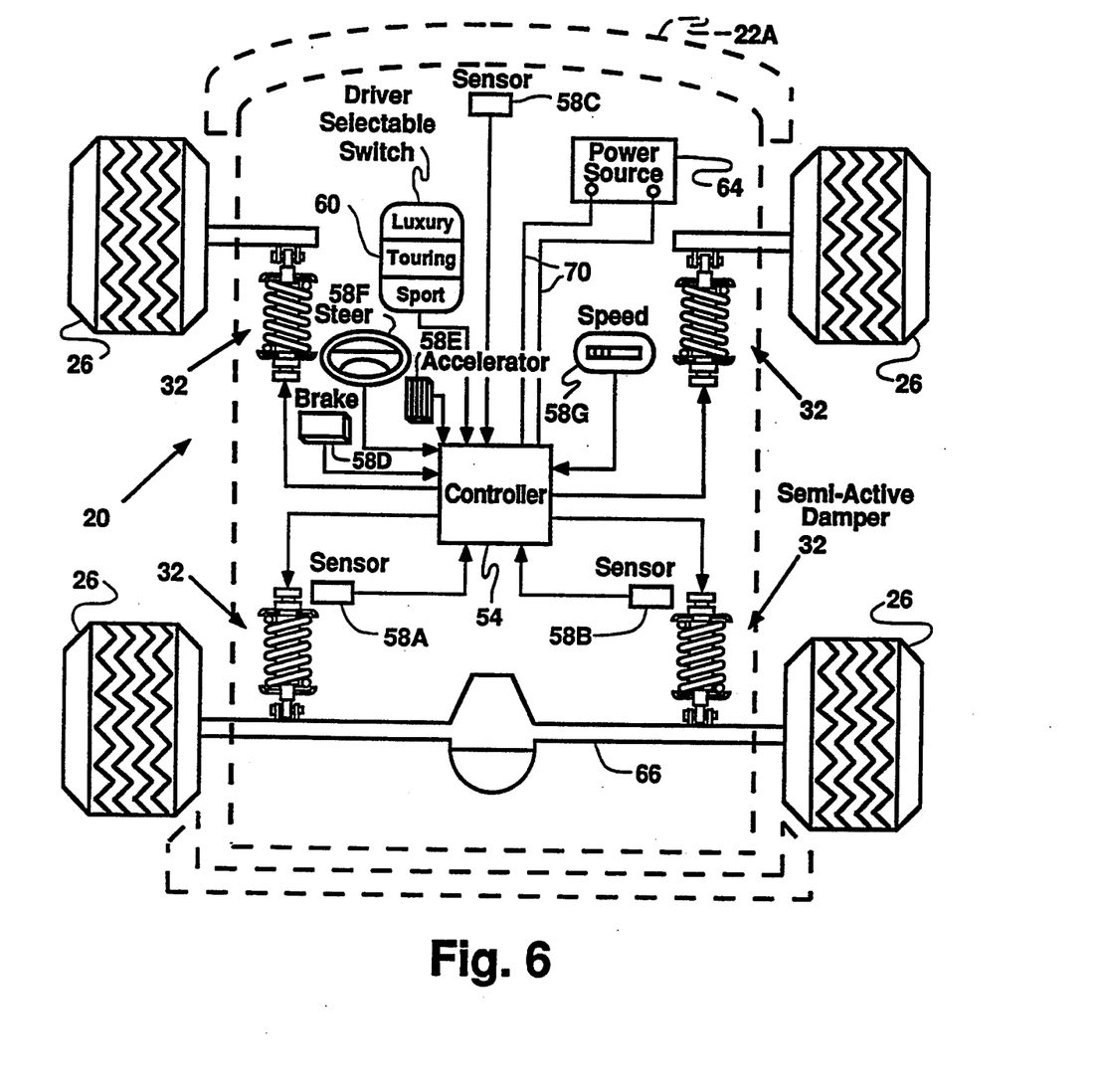
FIG. 6 is a schematic top view illustrating the components of the system.

FIG. 6 illustrates the semi-active suspension system 20 from a top view. The controller 54 takes inputs from sensors 58A, 58B and 58C and processes them by integrating the acceleration signal once. The absolute velocity information is then compared to the threshold value in pitch. Pitch is determined by comparing sensor 58C and one of 58A and 58B or the average of sensors 58A and 58B. Roll is determined by comparing sensor readings from sensors 58A and 58B.

Other sensors may be used to as part of the primary control. For example, sensor 58D is a switch on the brake can be used to set the damper to a higher damping setting during braking. Sensor 58E is a switch on the accelerator pedal can be used to set the damper to a higher damping setting during acceleration. Sensor 58F is a steering velocity sensor which can be used to set the damper to a higher setting. Sensor 58G is a speedometer sensor which can be used to set the damper to a higher damping setting as a function of vehicle speed. All of these sensors are generally useful for adaptive response, however, for real time response, the signals from acceleration sensors 58A, 58B, and 58C are used.

While the preferred embodiment of the present invention has been described in detail, various modifications, alterations, changes and adaptations to the aforementioned may be made without departing from the spirit and scope of the present invention defined in the appended claims. It is intended that all such modifications, alterations and changes as fall with in the scope of the appended claims be considered part of the present invention.

What is claimed is:

1. A controllable suspension system, comprising in combination:
   (a) a semi-active damper including a shock body for attachment to one of a first moving member and a second moving member, a piston rod telescopically received within said shock body, said piston rod being attachable to the other of said first and said second moving member, a semi-active valve controllably operating said semi-active damper for semi-actively varying a damping state of said semi-active damper between an On state and an Off state in real time;
   (b) a spring in parallel spring relation to said semi-active damper;
   (c) driver selectable means for selecting a magnitude of damping of said On state and said Off state of said semi-active valve from a preset range of damning magnitude values in order to select a ride preference;
   (d) at least two sensors for producing electrical signals from which an absolute velocity differential and a directional sign indicative of a direction of movement between two spaced apart portions of said first moving member can be extracted; and
   (e) means for overriding said driver selectable means when said absolute velocity differential derived from said at least two sensors' electrical signals exceeds a threshold and only when said directional signs of said electrical signals are opposite.

2. A controllable suspension system of claim 1 wherein said absolute velocity differential is derived by subtracting an integration of each of said electrical signals of said at least two sensors and said at least two sensors are accelerometers spaced apart from, and on opposite sides of, a roll axis of said first moving member.

3. A controllable suspension system of claim 1 wherein said absolute velocity differential is derived by subtracting an integration of each of said electrical signals of said at least two sensors and said at least two sensors are accelerometers spaced apart from, and on opposite sides of, a pitch axis and are indicative of pitch motion of said first moving member resulting from braking and acceleration.

4. A controllable suspension system of claim 1 further including means defining a null band for preventing said semi-active damper from reacting to road noise.

5. A controllable suspension system of claim 1 where means for overriding said driver selectable means includes reducing a width of a null band to a preselected width such that a high damping state is commanded.

6. A controllable suspension system of claim 1 where said driver selectable means includes a three position switch for selectively commanding one of a soft, medium, and stiff ride.

7. A controllable suspension system of claim 1 where said semi-active valve is one of the type including hydraulic, magnetorheological, and electrorheological.

8. A controllable suspension system, comprising:
   (a) at least two semi-active dampers attached between a first moving member and a second moving member and controlled by a primary control algorithm, each said semi-active damper including a semi-active valve for semi-actively varying a damping state of said semi-active dampers between a high-damping On state and a low-damping Off state in real time;
   (b) at least two acceleration sensors from which an electrical signal indicative of the absolute velocity differential and a directional sign indicative of direction of movement between two spaced apart portions of said first moving member can be derived; and
   (c) means defining a null band setting interacting with said primary control algorithm which is responsive a preselected threshold value of said absolute velocity differential derived from said sensors such that when said absolute velocity differential is below said reselected threshold value said means defining a null band setting is adjusted to set said null band wider and said low-damping Off state is provided and when said absolute velocity differential is exceeded and said directional sign is indicative of movement of said spaced apart portions in opposed directions, said means defining a null band setting set said null band setting narrower and a control of said dampers is initiated to command a higher damning setting.

9. A controllable suspension system of claim 8 further including a driver selectable switch for selecting said magnitude of said high-damping On state and said low-damping Off state of said semi-active valve that includes a three positions corresponding to soft ride, medium firm ride, and stiff ride.

10. A method of controlling a semi-active suspension system, comprising the steps of:
(a) setting an On state and Off state damping level of at least two semi-active dampers dependent upon a driver selected setting;
(b) determining the absolute velocity differential and a directional sign indicative of movements of at least two spaced apart portions of a first moving member;
(c) setting a preselected threshold width of a null band of a primary control algorithm responsive to said absolute velocity differential and said directional sign indicative of movements of said at least two spaced apart portions; and
(d) overriding said damping level dependent on said driver selected setting when said absolute velocity differential exceeds said preselected threshold width of said null band and when said directional signs are opposite, thus commanding said null band to a narrower width and as a result, initiating control of said On state and said Off state of said semi-active dampers.

11. A method of controlling a semi-active suspension system of claim 10 where said step of initiating control of said On state and said Off state of said semi-active damper further includes increasing the damping of said semi-active dampers.

12. A method of controlling a semi-active suspension system of claim 10 where said primary control algorithm is skyhook control.

* * * * *